United States Patent [19]
Fischer

[11] Patent Number: 5,298,725
[45] Date of Patent: Mar. 29, 1994

[54] BAR CODE SECURITY SYSTEM

[75] Inventor: Harold R. Fischer, San Diego, Calif.

[73] Assignee: TRW Inc., Redondo Beach, Calif.

[21] Appl. No.: 990,910

[22] Filed: Dec. 15, 1992

[51] Int. Cl.⁵ .................................................. G06V 5/00
[52] U.S. Cl. ..................................... 235/382; 235/375; 235/472
[58] Field of Search ........................ 235/382, 375, 472

[56] References Cited

U.S. PATENT DOCUMENTS

| | | | |
|---|---|---|---|
| 4,415,802 | 11/1983 | Long | 235/472 |
| 5,233,658 | 8/1993 | Bianco | 235/449 |

Primary Examiner—Harold Pitts
Attorney, Agent, or Firm—Ronald L. Taylor

[57] ABSTRACT

A security management system that utilizes bar codes to document inspections made by security officers at various areas being inspected. The system includes software, data scanners, data transmitters, a personal computer and noncopiable bar code labels. Noncopiable bar code labels are placed on security padlocks used to secure lock bar cabinets, on safes containing classified material and on secure area entrances and exits. When making the security rounds, the security officer will scan the bar code label on the padlock, safe or secure area entrance or exit. Later this information is processed by computer to generate a report showing the date, time and location of the inspection, and the identity of the inspecting officer.

12 Claims, 4 Drawing Sheets

BAR CODE SECURITY SYSTEM

BACKGROUND OF THE INVENTION

Companies working on projects that involve the use of classified information up to the secret level, normally store these materials in lock bar cabinets, safes and secure areas. When performing a routine security check, security officers would inspect the general area in which a locked cabinet was located and sign a sign-off sheet to show that a particular area had been inspected.

The Defense Investigative Service (DIS) has now mandated physical security inspections of lock bar cabinets used to store classified material up to and including secret materials. To comply with these requirements, it is required that the security personnel document the time and date of the inspections as well as the identity of the inspecting officer. The new Industrial Security Manual (ISM) from DIS also mandates that physical inspection of all lock bar cabinets is required every four hours during non-working hours and while the cabinet was not in use by the custodian. Security policies may also require that all safes and secure areas are to be inspected concurrently with the classified lock bar cabinets on a similar schedule. It is now required that the time, date, location and identity of the inspecting officer be documented for each inspection. The inspection time for a three-story building of approximately 90,000 square feet using the new documentation requirements is approximately 1½ hours. Therefore, there is a need for a more efficient system for inspecting lock bar cabinets, safes and secure areas while at the same time recording and preserving an accurate and reliable log of the inspections including time, date, inspecting officer, route, location, number of inspections and any incidents that occurred at a particular location.

SUMMARY OF THE INVENTION

The invention is a modification of the TISCOR Protrac system which is a Security Management System that utilizes bar codes to document the inspections made by security officers at various areas being inspected. The systems consist of Protrac Software, data scanners, data transmitters, a power supply, charges for the data scanners, an IBM PC or compatible computer and bar code labels.

The Protrac system is used primarily to record and document tour information and uses the PC based software to formulate tamper proof reports suitable for DIS requirements. This system was improved by placing noncopiable bar code labels on each Model 8077AB Sargent/Greenleaf security padlock used to secure lock bar cabinets containing classified material. The same bar code labels were used for safes containing classified material, secure area entrances and exits and the badge of the security officer making the inspection. When the security officer prepares to go on an inspection round he checks that the data scanner has the correct time and date. The officer then makes sure that all data is cleared from the data scanner and he inserts his employee number as well as the route which he will be inspecting. He does this by scanning the bar code identifying his employee number and scanning the bar code for the route he will be taking. As the officer approaches each classified lock bar cabinet, the officer grabs the padlock and scans the bar code label from left to right. By grabbing the security padlock the officer insures that the padlock is indeed locked. The same procedure applies to safes and secure areas.

After the inspection, the officer returns to the security computer and downloads the information into the PC. The PC will print a number of reports which gives specific information on time, date, location, the inspecting officer, any incidents that occurred and the number of scans made for each bar code label. If a particular lock has not been scanned then it will show up on the report and the officer knows exactly which lock was missed. Using this procedure, the security officer will have recorded all of the information necessary to meet the new security reporting requirements in the ISM and will have considerably reduced the amount of time required to make and record these inspections.

BRIEF DESCRIPTION OF THE DRAWINGS

The present invention will be better understood from the following detailed description of the preferred embodiment of the invention, taken in conjunction with the accompanying drawings in which like reference numerals refer to like parts and in which.

DESCRIPTION OF THE PREFERRED EMBODIMENT

Figure 1:
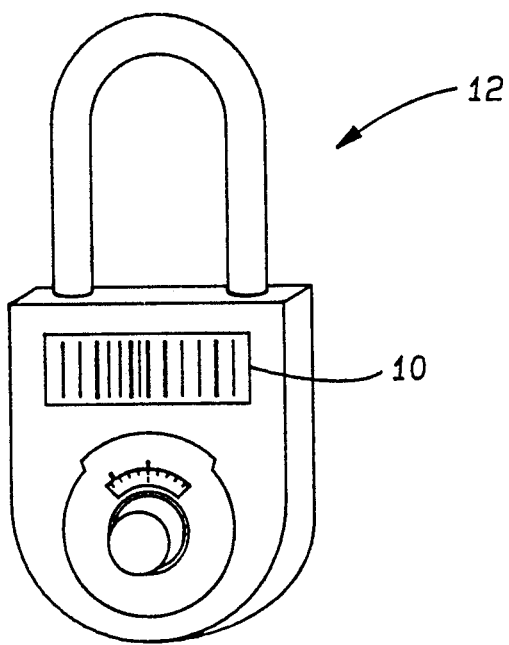
FIG. 1 shows a padlock with a bar code label affixed thereto.
Figure 6:
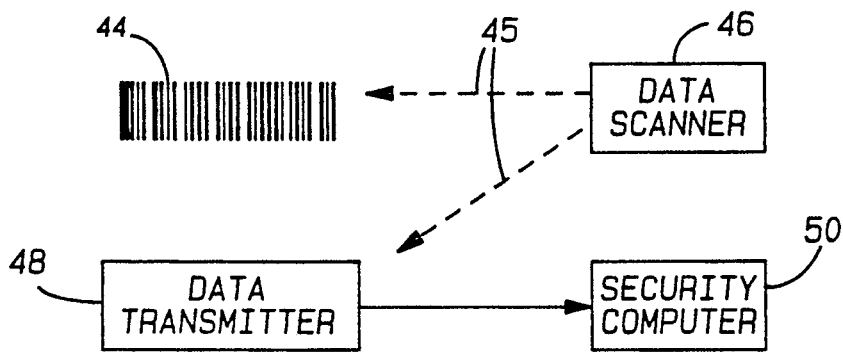
FIG. 6 is a block diagram showing the hardware components of the security system.

FIG. 1 shows a model 8077AB Sargent/Greenleaf security padlock that is used to secure lock bar cabinets containing secret material and below. A noncopiable bar code label 10 is placed on the front of the padlock 12. The bar code label 10 is encoded with information identifying its exact location and the lock bar cabinet that it is securing. As each officer prepares to go on an inspection round he or she first prepares a data scanner for service. FIG. 6 is a block diagram of the hardware used to prepare and implement the security management system. The bar code label 44 is a noncopiable bar code label that can be used for any number of purposes related to the storage and inspection of classified information. The data scanner 46 is a stand alone unit that is not normally connected to any of the other hardware components. For example, dotted line 45 pointed at the bar code label 44 is a dotted line indicating that the data scanner 46 reads information from the bar code label 44 but is not physically connected to the bar code label 44. Similarly, the dotted line 45 pointing at the data transmitter 48 is representative of the fact that the data scanner can be physically connected to the data transmitter 48 for the purpose of downloading information from the data scanner 46 through the data transmitter 48 to the security computer 50. Once the data is downloaded from the data scanner 46 to the security computer 50, the data scanner 46 is physically disconnected from the data transmitter 48.

Figure 4:
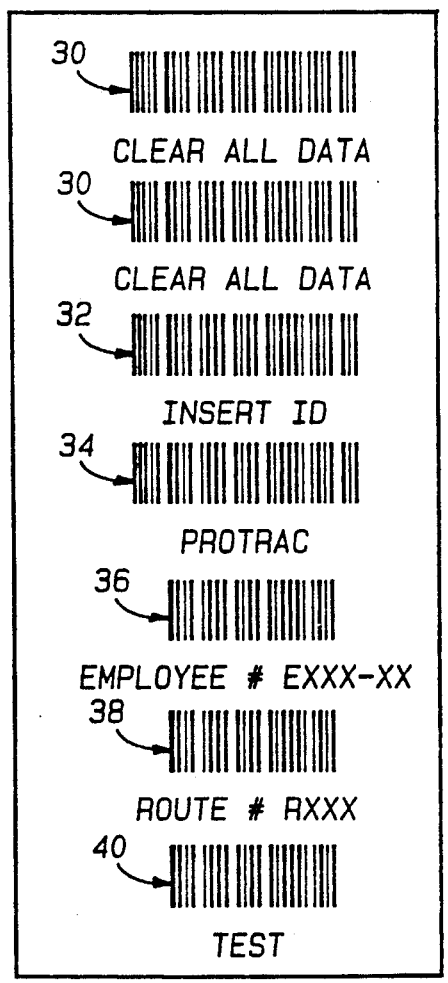
FIG. 4 shows a time and date bar code test page.

Turning back to FIG. 1, the data scanner 46 is used to scan the information from the bar code label 10 on the padlock 12. Preparing the data scanner 46 for service includes checking to see that the data scanner has the correct time and date. To prepare the data scanner 46 to verify that it contains the proper time and date, the security officer obtains the time and date test sheet shown in FIG. 4 and scans the bar codes from top to bottom. The first two bar codes 30 clear all previous inspection data from the data scanner. This bar code is scanned twice to make sure that all data is cleared. The next bar code 32 is scanned to prepare the data scanner to scan the next bar code 34 which identifies the program that will control the data scanner. Next, bar codes 36 and 38 are entered to simulate the entry of an employee I.D. and a route I.D. number. These bar codes are actually neutral and do not represent any particular employee or route number but are merely entered to fill up the data slot so that the time and date test can be completed. The next bar code 40 is then scanned to verify that the data scanner has been properly set up. The security officer then proceeds to the security computer 50 (FIG. 6) to verify that the time and date contained in the data scanner is the same as the time and date contained on the security computer. The security officer inserts the data scanner 46 into the data transmitter 48 and downloads the information to the computer 50. The security officer then reads a computer printout generated by the security computer that verifies that the time and date contained in the data scanner match the time and date contained in the security computer 50. This is an important step because on any given occasion a data scanner may not have been properly charged or may not be in proper working order. By verifying the correct time and date, the security officer is assured that the information obtained when making his security rounds will be useful and accurate so that the security officer will not have to recheck that route because the data he obtained was incorrect.

Figure 5:
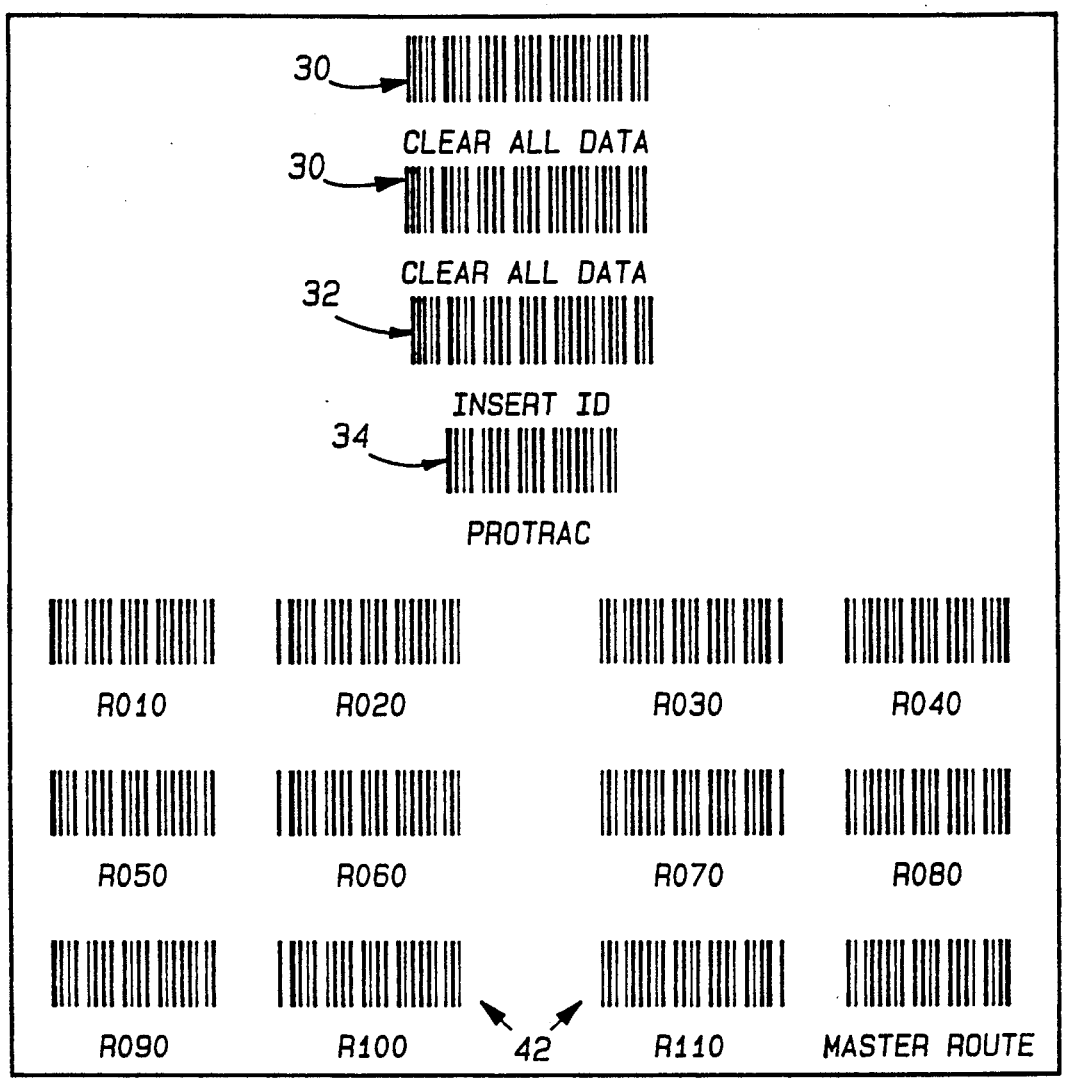
FIG. 5 shows a bar code sheet used to prepare the data scanner to scan the bar codes on a particular route.

Turning to FIG. 5, after the time and date in the data scanner 46 have been verified, the security officer will perform the following procedure. First, the officer will obtain the sheet of bar codes used to prepare the data scanner for a shift. Once again, he will use the bar codes 30 (FIG. 5) to clear all data from the data scanner. This is done twice to insure that all data is cleared from the data scanner. Next, the security officer uses bar code 32 to prepare the data scanner to accept the program identification bar code 34. The security officer will then scan the bar code that identifies the security officer who will make the rounds. This bar code is attached to the security officer's badge. Next, the officer will scan one of the bar codes 42 each of which identifies a different security route. Once the appropriate route bar code has been scanned the officer can proceed to scan the bar codes on that route.

Figure 7:
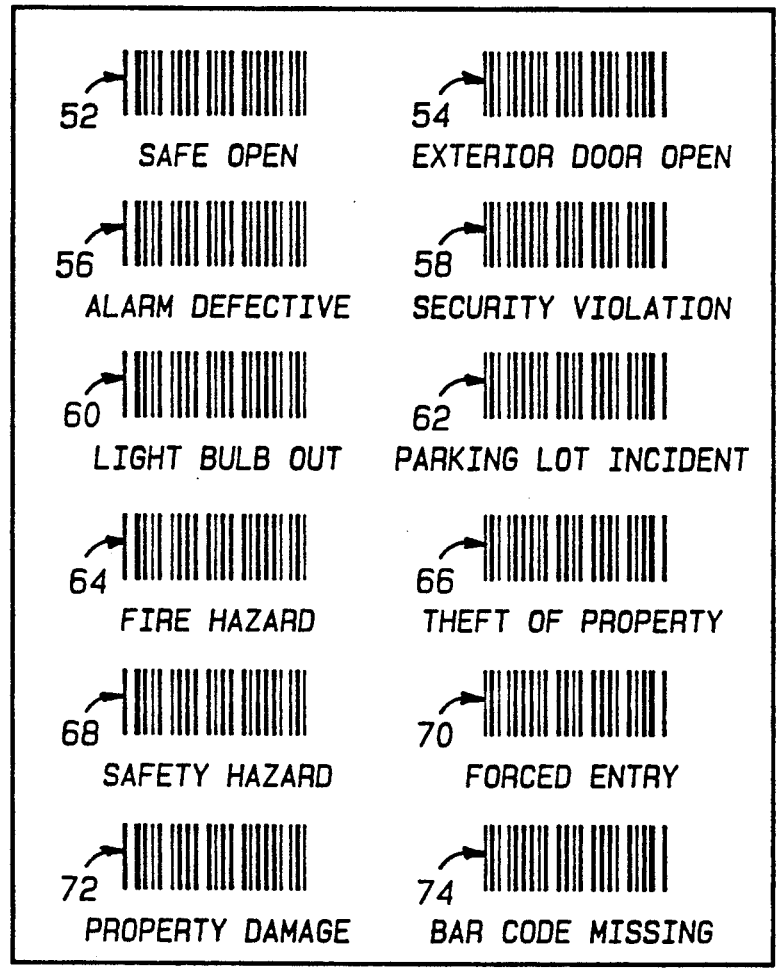
FIG. 7 shows an incident sheet used by a security guard to record a particular security violation.

As an officer approaches a classified lock bar cabinet, the officer grabs the sides of the security padlock 12 (FIG. 1) and scans the affixed bar code label 10 from left to right with data scanner 46. A beep will indicate that the scan was successful. By grabbing the security padlock the officer ensures that the padlock is indeed locked. If the padlock is not locked, a security violation has resulted which is charged to the person leaving the cabinet unlocked. The security officer can carry with him an incident sheet of bar codes that identifies particular security violations. For instance, if a particular lock is not secured, the security officer, after scanning the bar code on the lock, can scan the bar code corresponding to the code for "lock not secured". Similar security violations would include safe open, alarm defective, light bulb out, fire hazard, safety hazard, property damage, exterior door open, security violation, parking lot incident, theft of property, forced entry and bar code missing. Other types of incidents can be represented by bar codes that correspond to the particular security needs of a business. An example of an incident sheet is shown in FIG. 7 with the even numbers 52 through 74 representing particular security violations that may be encountered by a security officer when making his or her rounds.

The same procedure applies to safes and secure areas except that the officer also inspects the built-in, three-position, dial-type combination locks used to secure the safe or the security area entrance or exit door.

Figure 2:
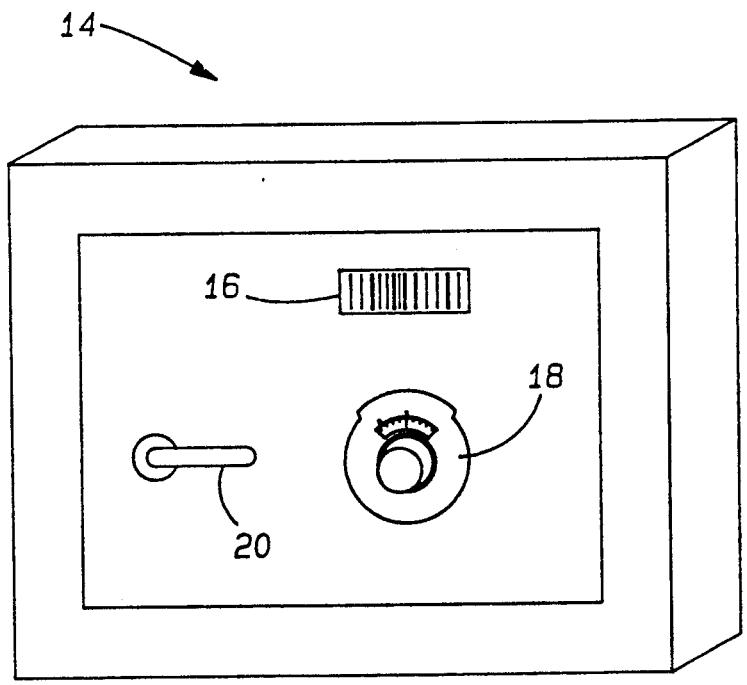
FIG. 2 shows a safe with a bar code label attached.

FIG. 2 shows a safe 14 with a built-in three position dial type combination lock 18 and a noncopiable bar code label 16.

In making his or her rounds, the officer would approach the safe 14 and check the safe handle 20 to make sure that the safe was secure. The officer would then scan the bar code label 16 with the data scanner 46. The data scanner would accurately record the information contained on the bar code label 16 and the officer would move onto the next area to be checked.

Figure 3:
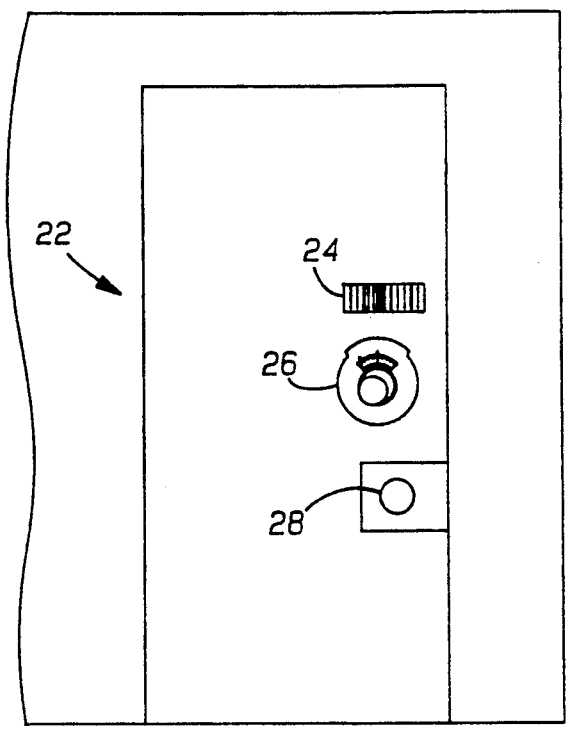
FIG. 3 shows a door to a secure area and the location of the bar code label.

With reference to FIG. 3, as an officer approaches a secure area 22, the officer would check the door handle 28 to make sure that the door was secure. The officer would then scan the information contained on the noncopiable bar code label 24. Again, if there was any particular problem with the safe referred to above or the secure area shown in FIG. 3 then the security officer could refer to his incident sheet of bar codes and record the problem with that safe or secure area.

Upon completion of the inspection round, the officer returns to a security station and downloads the accumulated data to the security computer 50. The PC will now print a number of reports, all of which give specific information on time, date, location and number of scans made of each scanned bar code label as well as any incidents that were recorded. If any active bar code label is missed it will result in a negative scan allowing the officer to go back to the bar code label missed for subsequent scanning.

The Protrac data base can be updated quickly as changes in bar code labels occur due to the changes to security padlocks, safes or doors. Once a week the accumulated data is transferred onto diskettes from the PC and archived for future reference or, if need be, inspection by the DIS or others.

This system offers a number of advantages that increase the efficiency of a security officer making rounds. It also very accurately records information gathered during the making of the rounds and the bar code labels are versatile and can be placed on any surface, indoor as well as outdoors.

This system also provides a way of accurately recording the time and date of the inspection, plus the name of the officer who inspected the classified lock bar cabinet, safe or secure area. Since each classified material custodian with a lock bar cabinet is issued a padlock, the serial number of which is recorded concurrently with the bar code label number and the custodian's name and location of the padlock, there can be no doubt in a subsequent investigation as to the status of any one cabinet.

Although a preferred embodiment of the invention has been described above by way of example only, it will be understood by those skilled in the art that modifications may be made to the disclosed embodiment without departing from the scope of the invention which is defined by the appended claims.

What is claimed is:

1. A security management system for efficiently recording and memorializing security information relating to the storage of classified information comprising:

a noncopiable bar code label, a data scanner for scanning said bar code label, a personal computer, a data transmitter for transmitting data from said data scanner to said personal computer, said bar code label being affixed to a surface area located near a locking means, said locking means being used to secure an area containing classified material wherein the location of said locking means corresponds to said bar code label, said data scanner for recording the time and date that a particular bar code label was scanned and said data scanner also for recording the identity of the security officer making the scan, said personal computer for generating a report that shows the date of the inspection, the time of the inspection, the location inspected and the identity of the inspecting officer.

2. The security management system of claim 1 wherein said locking means is a padlock and said bar code label is affixed to said padlock.

3. The security management system of claim 1 wherein said locking means is a safe and said bar code label is affixed to said safe.

4. The security management system of claim 1 wherein said locking means is a door with a lock and said bar code label is affixed to said door.

5. The security management system of claim 1 including a bar code incident sheet for use by a security officer when making his rounds wherein the officer, after identifying a security violation, can record that violation by referring to and scanning the bar code on the bar code incident sheet that corresponds to the particular security violation.

6. The security management system of claim 2 including a bar code incident sheet for use by a security officer when making his rounds wherein the officer, after identifying a security violation, can record that violation by referring to and scanning the bar code on the bar code incident sheet that corresponds to the particular security violation.

7. The security management system of claim 3 including a bar code incident sheet for use by a security officer when making his rounds wherein the officer, after identifying a security violation, can record that violation by referring to and scanning the bar code on the bar code incident sheet that corresponds to the particular security violation.

8. The security management system of claim 4 including a bar code incident sheet for use by a security officer when making his rounds wherein the officer, after identifying a security violation, can record that violation by referring to and scanning the bar code on the bar code incident sheet that corresponds to the particular security violation.

9. A method for efficiently recording and memorializing security information relating to the storage of classified information comprising the steps of:

affixing a noncopiable bar code label to a member used to secure an area containing classified material, said member corresponds to the bar code label attached to said member, scanning said bar code label and recording the time and date that the bar code label was scanned and also recording the identity of the security officer making the scan, recording security violations as they occur by scanning a bar code label that corresponds to the particular security violation, downloading the scanned information in said data scanner through a data transmitter to a personal computer, and generating a report that shows the date of the inspection, the time of the inspection, the location inspected, the identity of the inspecting officer and any security violation that occurred at the location inspected.

10. The method of claim 9 wherein the member is a padlock used to secure a lock bar cabinet, said padlock having a serial number which corresponds to the bar code label attached to said padlock.

11. The method of claim 9 wherein the member is a safe, said safe having a serial number which corresponds to the bar code label attached to said safe.

12. The method of claim 9 wherein the member is a door with a lock and wherein the location of said door corresponds to the bar code label attached to said door.

* * * * *